United States Patent [19]

Tidwell

[11] Patent Number: 4,673,422

[45] Date of Patent: Jun. 16, 1987

[54] AIR CLEANING SYSTEM

[76] Inventor: John H. Tidwell, Rte. 1, Box 267, Ashville, Ala. 35953

[21] Appl. No.: 784,209

[22] Filed: Oct. 4, 1985

[51] Int. Cl.$^4$ .............................................. B01D 47/02
[52] U.S. Cl. ....................................... 55/248; 55/255; 55/404
[58] Field of Search ................. 55/248, 244, 255, 256, 55/257 C, 404, 405, 470, 472; 15/353

[56] References Cited

U.S. PATENT DOCUMENTS

| | | | |
|---|---|---|---|
| 2,171,248 | 8/1939 | Van Berkel | 55/472 |
| 2,221,572 | 11/1940 | Brock et al. | 55/248 |
| 2,244,165 | 6/1941 | MacFarland et al. | 55/470 |
| 2,295,984 | 9/1942 | Wilson | 55/472 |
| 2,608,268 | 8/1952 | Gerber | 55/472 |
| 2,889,570 | 6/1959 | Duff | 55/472 |
| 2,909,800 | 10/1959 | Grindle et al. | 15/353 |
| 2,945,553 | 7/1960 | Brock | 55/248 |
| 3,006,020 | 10/1961 | Fillery | 55/472 |
| 3,032,954 | 5/1962 | Racklyett | 55/472 |
| 4,142,270 | 3/1979 | Nauta | 15/353 |

*Primary Examiner*—Bernard Nozick
*Attorney, Agent, or Firm*—George J. Porter

[57] ABSTRACT

An air cleaning system is provided in which a motor (22) mounted within a housing (20) drives a fan (51) which creates an air flow from inlet (31) through an air inlet compartment (32), spinner (42) and turbine driver (44). The air flow rotates the turbine driver (44) which in turn rotates the spinner (42). The spinner is designed to separate foreign particles from the flowing air. A liquid (33) may be included in the air inlet compartment. The clean air then passes through the air outlet compartment (45) air passage (61), and fan chamber (50), and exits through outlet (53). The device utilizes a separate air flow cooling system which circulates air through vents (26) and (23) in the motor housing (21) and through vents (24) and (25) in the motor casing (21).

8 Claims, 1 Drawing Figure

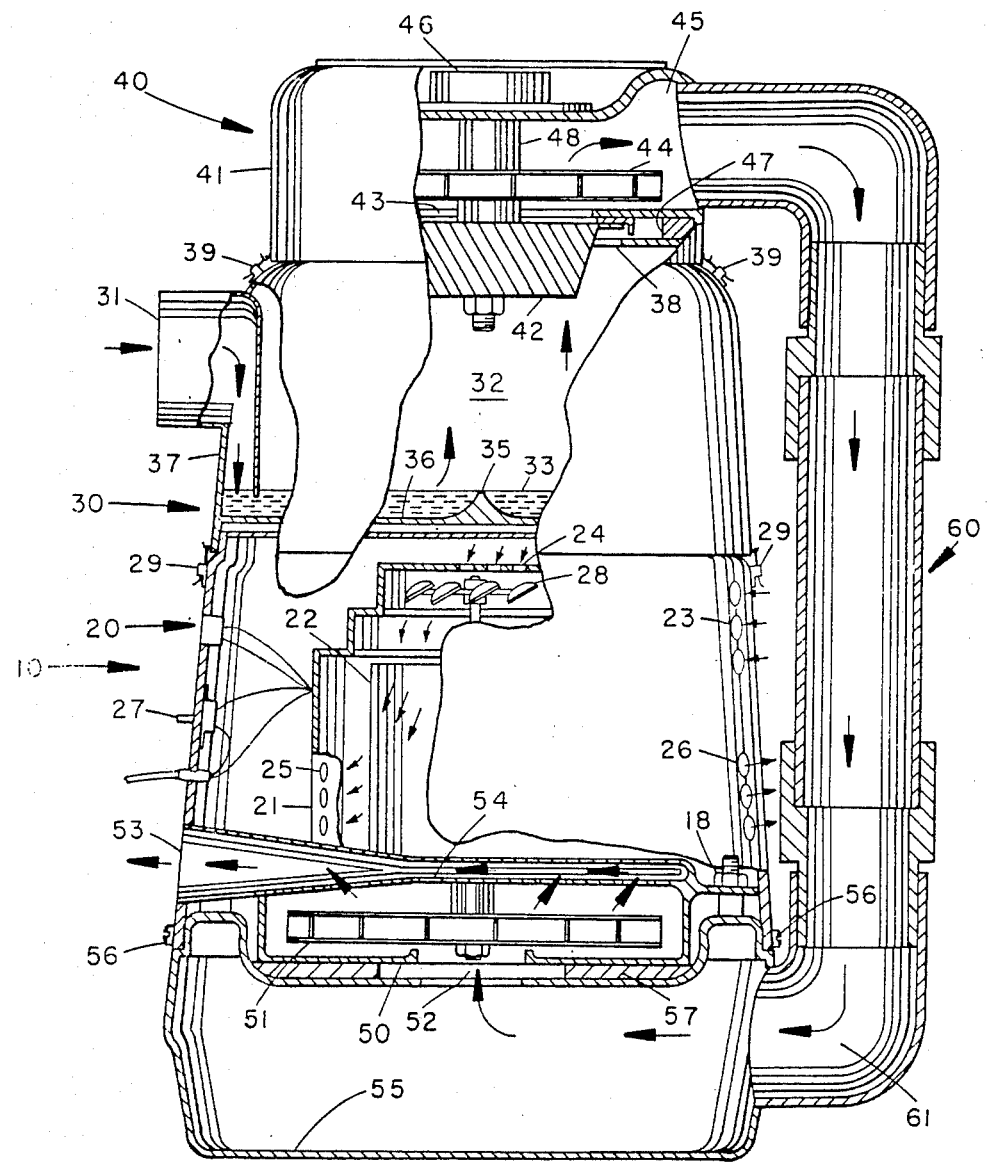

AIR CLEANING SYSTEM

TECHNICAL FIELD

The present invention relates to a system for removing dust or other foreign particles from air. The system effectively cleans air that has been forced through an object to be cleaned such as a carpet and is equally effective for cleaning the air within a room, either in the home or a commercial facility.

BACKGROUND OF THE INVENTION

Air cleaning systems are well known in the prior art. These systems may be used in conjunction with a means for dislodging dirt or foreign matter from a carpet, as with the typical home vacuum cleaner. While the system disclosed herein is exceptionally well suited for use as a vacuum cleaner, its design features provide the flexibility needed for effective use for the cleaning of room air within a household or in a commercial environment.

This system may utilize a liquid bath as an aid in separating dirt or other foreign materials from the air. The method is well known in the art and is disclosed in U.S. Pat. Nos. 2,221,572, 2,228,750 and 2,945,553 to Brock as well as in U.S. Pat. Nos. 1,839,582 to Nordhem, 2,306,212 to Gerstmann, 2,321,653 to Carlson and 3,343,199 to Nolte. While each of these prior art devices utilize a similar general principle of air purification by the impingement of the air upon a liquid, only the Brock patents provide the feature of a mechanical separator means for removal of residual impurities and of vapor which may be generated by turbulence within the liquid. While this separator feature provides a greatly improved cleaning system, these prior art devices have several disadvantages which have been overcome by the present invention. Examination of the Brock devices reveals that in each of them, the separator means is attached directly to the system's motor. Thus the separator is rotated at the speed of the motor which is not the optimum speed at which a separator functions most effectively. This is because the motor speed is dictated by the requirements of the main drive fan rather than by the requirements for optimum separator speeds. Typically a great deal of power is wasted by rotating the separator of these prior art devices at a much higher speed than is needed.

The air flow in these prior art devices follows a tortuous and severely impeded path which directs the flow around several support structures, through a series of compartments and restrictive passages and requires several changes in direction. Such a flow pattern is obviously inefficient in that a considerable portion of the power available from the system air driver is lost as the air is forced through each of these impediments.

Of particular note is the fact that the air flow pattern of these prior art devices carries air which has passed through a water chamber, directly into contact with the electric motor which powers the device. It can readily be seen that the operation of an electric motor in such a high humidity environment is a serious safety hazard as well as being detrimental to the life of the motor.

In the prior art devices the arrangement of the electric motor immediately above the water compartment creates another serious hazard since, in the event the device is overturned, water is permitted to come into direct contact with the electric motor and its wiring.

It will be noted that cleaning of either the water container or the separator of these prior art devices requires removal of the main body of the device. The main body of these devices includes a motor, its wiring and switching means, a fan and all housings except for the water container. Thus to clean or change water in the prior art devices requires handling the heaviest and most cumbersome parts of these devices.

A further disadvantage of these prior art devices is the need to remove the cleaning water before storing. This is necessary because of the high humidity environment created around the motor caused by the immediate proximity of the water. It will be readily understood that such an environment would greatly shorten the life of the motor as well as all other metal components.

Review of the prior art also reveals that access to the motor and fan mounts is very limited. Thus repair of these devices is quite difficult and time consuming.

In view of the foregoing discussion it should be apparent that known prior art devices as mentioned above do not provide a cleaning system which will adequately meet the requirements of either household or commercial use.

The ideal air cleaning system is one which provides safety from electrical shock, efficient use of available power, efficient removal of foreign particles from the air, longevity, and convenience in use, in cleaning, repairing, and storage.

Therefore, it is an object of my invention to provide an air cleaning system which utilizes the feature of a liquid cleaning agent but yet locates the liquid so as to minimize the danger of electrical shock.

It is another object of my invention to provide an air cleaning system which, when utilizing the feature of a liquid cleaning agent, provides an effective and easily optimized means for separating both moisture and foreign particles from the air being cleaned.

It is a further object of my invention to provide an air cleaning system which provides the least possible restriction to the flow of air through the system.

Still another object of my invention is to provide an air cleaning system which utilizes a liquid cleaning agent and yet provides a simple and convenient arrangement for the cleaning of the system and changing the liquid, and wherein the normally cleaned parts of the system may be totally submerged for cleaning purposes.

Yet another object of my invention is to provide an air cleaning system which utilizes a liquid cleaning agent and provides an arrangement which minimizes the humidity around critical parts of the system by locating the liquid as far removed from said critical parts as possible.

A further object of my invention is to provide an air cleaning system which may be easily repaired.

Another object of my invention is to provide an air cleaning system which includes an air cooling system which is independent of the air flow within the cleaning passages of the device.

SUMMARY OF THE INVENTION

The present invention is an air cleaning system having a fan mounted within a chamber which includes an inlet and an outlet, and wherein the fan is driven by a motor. The inlet of the fan chamber is connected by an air passage to an air driven separator. Thus, as the fan is driven by the motor, air is pulled through the air driven separator causing it to rotate. As the separator rotates, incoming air passing therethrough is cleaned as it is subjected to centrifugal force which separates foreign particles from the air as the air passes through the separator. A container of liquid is located below but upstream of the separator. When using this feature the incoming air is directed to or through the liquid, which retains a portion of the foreign particles present in the air. The separator then expels the remaining particles as well as moisture carried by the air.

BRIEF DESCRIPTION OF THE DRAWING

The drawing is an elevational view partially in section of the air cleaning device of my invention.

DETAILED DESCRIPTION OF THE INVENTION

The invention which is shown in partial section is designated generally by the numeral 10. The invention, an air cleaning system, is a generally cylindrical device having an external air flow connector assembly 60 which connects the upper portion of the device to the lower portion for the purpose of conducting the flow of air therebetween.

The main body or cylindrical portion of the device comprises three interconnected but detachable sections; a motor housing 20, an air inlet compartment housing 30 and a separator assembly 40.

The motor housing 20 comprises a motor 22 generally inclosed within a motor casing 21. The motor casing 21 is provided with a cooling air inlet 24 and outlets 25, and houses a cooling fan 28 designed to circulate cooling air. Air is supplied to this motor cooling system through inlets 23 and exits through outlets 26 provided in the motor housing 20. A switch 27 is connected in a standard manner to wires from the motor and from a electrical power source, to control operation of the motor. A fan 51 is rotatably attached to the motor 22 in the lower portion of motor housing 20. The fan 51 is substantially enclosed by a fan chamber 50 which is provided with an air inlet 52 an air outlet 53 and an air flow passage 54 therebetween. The lower portion of motor housing 20 connects to air flow chamber 55 which is functionally combined with air flow connector assembly 60 to form air passage 61, thus connecting air outlet compartment 45 to air inlet 52. The upper portion of motor housing 20 is detachably interconnected by means of clamps 29 to the lower portion of air inlet compartment housing 30. The lower portion of motor housing 20 is attached to air flow chamber 55 by screws 56. A seal 57 is positioned between the fan chamber 50 and the air flow chamber 55. Removal of screws 56 permits motor housing 20 to be raised so as to completely expose the motor and fan assemblies. This arrangement is particularly well suited for the quick removal or repair of the motor and fan assemblies which mount as a single unit, and are retained by conventional bolts 18 which are arranged around the outer circumference of the motor and fan assemblies.

The air inlet compartment housing 30 comprises a lower portion closed by base 36 and is adapted to contain a liquid 33 which may be water or a suitable substitute such as oil, depending upon the cleaning application. A liquid level indicator 35 is attached to base 36 to assure use of the optimum quantity of liquid. The side portion 37 of air inlet compartment housing 30 includes an air inlet 31 which is adapted to mate in a conventional way to an air feeder attachment such as conventional power head cleaning hose or an intake manifold such as may be used in purifying air from a home or industrial room. The upper portion of the air inlet compartment housing 30 includes an air inlet compartment 32 which terminates in an opening 38, and is adapted to detachably interconnect by means of clamps 39 to the lower portion of separator assembly 40. A seal 47 is located between compartment housing 30 and separator assembly 40.

The separator assembly 40 comprises a separator housing 41 which encompasses an air outlet compartment 45. A turbine driver 44 is located within the air outlet compartment immediately above passage 43, and is rotatably mounted by a shaft 48 to turbine mount 46. The turbine mount 46 retains a conventional shaft bearing not shown. A spinner 42 is also mounted to shaft 48 and is positioned adjacent the underside of turbine driver 44 immediately below passage 43. The spinner 42 is thus mounted so as to be driven rotatably by the turbine driver 44. The spinner 42 extends through opening 38 and into the air inlet compartment 32. The air outlet compartment 45 opens into the air flow connector assembly 60 which combines a series of elbows, connectors and a tube to form air passage. Passage 61 becomes a functional part of air flow chamber 55 and thus the two provide a passage 61 for the flow of air between the air outlet compartment 45 and the air inlet 52 in the fan chamber 50.

OPERATION OF THE INVENTION

In operation of the invention, the motor 22, having been actuated by electrical power transmitted through switch 29, drives the fan 51 so as to force air through air passage 54 and air outlet 53, thus creating an area of low pressure, progressively within the air passage 61, the air outlet compartment 45 and the air inlet compartment 32. As air moves to fill this area of low pressure it flows into the air inlet 31 and passes progressively through the air inlet compartment 32, opening 38, passage 43, air outlet compartment 45, the air passage 61, and inlet 52.

As air is introduced into the system through air inlet 31 foreign particles contained in the air are driven with great force into the liquid 33. This force creates a considerable turbulance within the liquid 33 which in turn creates an environment of high moisture content combined with foreign particles which were not absorbed by the liquid upon first contact. As is obvious, the air must, at some point in the system, be purified of both foreign particles and moisture before it is allowed to progress through the air cleaning system. This function is effectively performed by the separator assembly 40 in the following manner. As the air flow passes from the air inlet compartment 32 through the spinner 42 and rotatable turbine driver 44, it causes the turbine driver 44, to rotate at a relatively high rate of speed, which is predetermined by the design of the turbine. In turn, the turbine driver rotates the spinner 42 at its designed optimum speed to centrifugally separate moisture and foreign particles from the air so as to effectively accomplish the cleaning task at hand. As pointed out earlier the size and configuration of the turbine may be changed to meet the needs of a particular cleaning task. After passing through the turbine driver 44, the purified air continues as is shown by the flow arrows on the drawing, through air passage 61, and fan chamber 50, and exits the system at air outlet 53.

From the above, it may be seen that the invention provides an air cleaning system in which the portions requiring periodic cleaning, namely, the air inlet compartment housing 30 and the separator assembly 40, are easily detached, are light in weight, and may be totally immersed in water or any suitable cleaning solution to assure thorough cleaning in the easiest possible manner. The invention further provides an air flow system which is free from unnecessary restrictions and therefore much more efficient than prior art devices of this type. Because of the isolation of the motor from the main air flow system and the water container and because of its totally independent air cooling system, the invention provides greater safety and longevity than was available heretofor. It is also apparent that the motor and fan assemblies are more easily accessible for repair or replacement than those on prior art devices. Of considerable benefit is the flexibility of the design speed of the spinner portion of the separator. Whereas the spinner speed of prior art devices must be the same as the motor speed, the present invention permits this speed to be changed during design to achieve the optimum speed for a particular application. Thus, a system designed for use as a room air purifier may be designed with an optimum separator speed for such an application while a system designed for heavy duty use wherein large particles of foreign material must be removed from the intake air would utilize a different separator speed. This feature also permits the device to be used without addition of liquid for certain applications. It is also apparent that in circumstances wherein a wide variety of cleaning jobs may be encountered, this system may be furnished with optional separator assemblies to accommodate the user's needs. No known prior art device has this flexibility.

I claim:

1. An air cleaning system comprising:
   a motor housing;
   a motor mounted within said housing;
   a fan attached to and rotatably driven by said motor;
   a fan chamber surrounding said fan and having an air inlet and outlet;
   a separator housing means mounted adjacent to and in spaced relation with said motor housing, said separator housing means having an inlet disposed in communication with a chamber within said separator housing means, and, an outlet disposed in communication with said fan chamber; and, an air driven separator means mounted in said chamber of said separator housing means to receive airflow from said inlet thereof for rotation of said separator means and removal of foreign matter from said airflow by centrifugal force responsive to rotation of said separator means, said airflow being further directed through said outlet of said separator housing means to said fan chamber to be ejected by said fan therein.

2. The air cleaning system of claim 1 wherein said separator means comprises:
   a rotatable spinner mounted within the outlet of said separator housing means, said spinner having air openings therethrough; and
   a rotatable drive turbine mounted in the outlet of said separator housing means, said drive turbine being rigidly attached to said spinner whereby said air flow from said inlet to said outlet passes through the air openings in said spinner and through said drive turbine.

3. The air cleaning system of claim 2 wherein said separator housing means is partially filled with a liquid and wherein air entering said inlet enters in close proximity to the upper level of said liquid.

4. An air cleaning system comprising:
   a motor housing having an upper and lower portion;
   an air inlet compartment housing having a generally open upper portion, a closed lower portion, and a side portion having an air inlet therein;
   an air driven separator assembly having an upper portion which defines an air outlet compartment, and a lower portion having an air passage therein, a rotatable spinner having air openings therein, said spinner being rotatably mounted immediately below said separator air passage; a rotatable turbine driver mounted immediately above said separator air passage, said spinner being rigidly attached to and driven by said turbine driver, said lower portion of the separator assembly being detachably mounted to the upper portion of said air inlet compartment housing being detachably mounted on the upper portion of said motor housing;
   a motor mounted within said motor housing;
   a fan mounted adjacent to the lower portion of said motor housing, said fan being attached to and rotatably driven by said motor;
   a fan chamber substantially surrounding said fan, said fan chamber having an air inlet and an air outlet;
   an air flow passage connecting said fan chamber inlet to said air outlet compartment whereby rotation of said fan by said motor will cause air to flow from the air inlet of said air inlet compartment through the air openings in said spinner, through said air passage and through said turbine driver thereby rotatably actuating said spinner so as to separate foreign particles from the flowing air by centrifugal force, said air continuing its flow progressively through said air outlet compartment, the air flow connector assembly, and the air inlet and outlet of said fan chamber.

5. A device as set forth in claim 4 wherein the lower portion of said air inlet compartment housing is adapted to contain a liquid.

6. A device as set forth in claim 5 wherein said motor is surrounded by a motor casing, and wherein air vents are provided in said motor casing and said motor housing to provide cooling air for said motor, independent of the air flow through said fan and fan chamber.

7. A device as set forth in claim 6 wherein said motor includes a motor cooling fan for circulating cooling air through said air vents in said motor housing and said motor casing.

8. A device as set forth in claim 7 wherein said motor housing is removable in a vertical direction thereby exposing said motor and fan for repair or removal.

* * * * *